Jan. 13, 1948. E. G. CHATELAS 2,434,486
ROUNDABOUT
Filed March 13, 1946 2 Sheets-Sheet 2
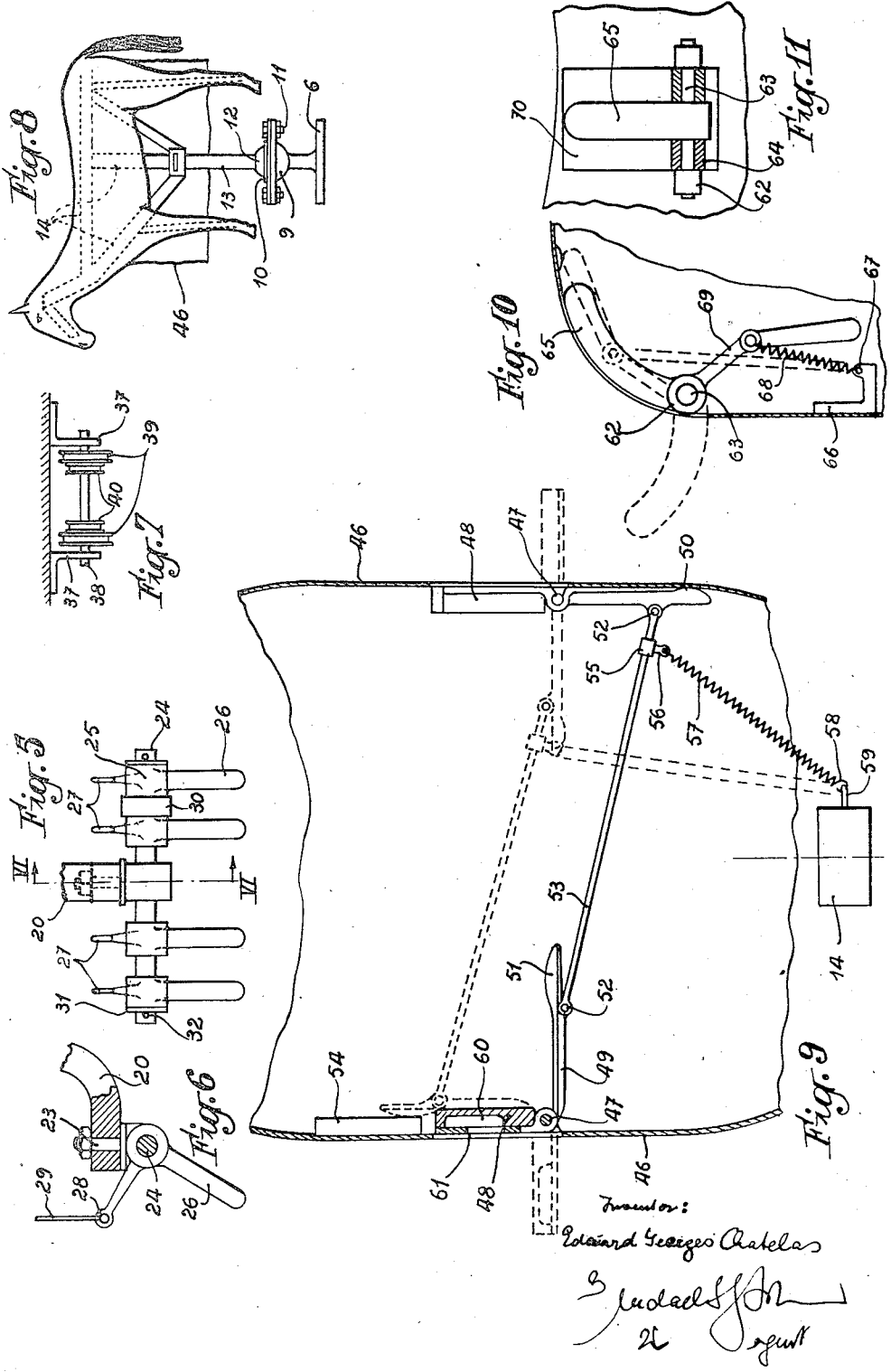

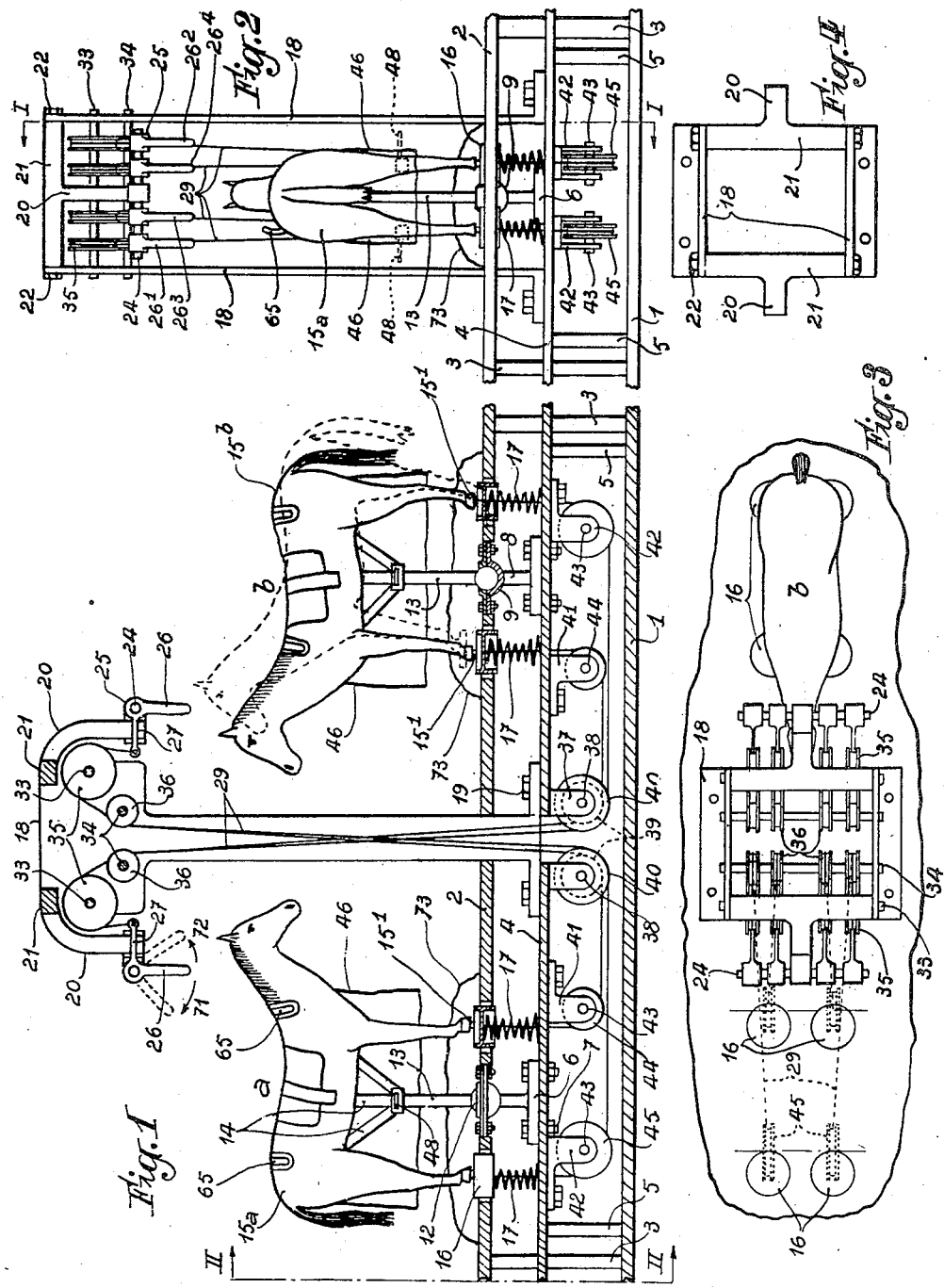

Patented Jan. 13, 1948

2,434,486

UNITED STATES PATENT OFFICE 2,434,486

ROUNDABOUT

Edouard Georges Chatelas, Nice, France, assignor of one-half to Jean Moreau, Nice, France Application March 13, 1946, Serial No. 654,096
In France June 30, 1945

9 Claims. (Cl. 272—43)

1

My invention relates to roundabouts of the kind comprising horses or the like adapted to move with respect to the rotating member on which they are supported, for instance to oscillate about a transverse axis.

A first object of my invention is to provide a roundabout wherein the horses will be submitted to movements which the individual riders are quite unable to expect.

A further object of my invention is a roundabout wherein manual means are provided for each rider to actuate the horse of another rider.

Still a further object of my invention is a roundabout comprising a number of pairs of horses facing each other, a universal joint to support each horse while permitting same to orbitally oscillate about the said joint, spring means to elastically maintain each horse in an average position, a support between the horses of each pair, a row of levers carried by the said support in front of each horse to be actuated by each rider and cable means to connect each lever to a hoof of the adverse horse in such a manner that each rider, by actuating the levers disposed in front of him, may cause oscillations of the adverse horse in a longitudinal or transverse direction.

In the annexed drawings:

Fig. 1 is a vertical longitudinal section showing a pair of horses in a roundabout established in accordance with my invention.

Fig. 2 is a section at right angles to the plane of Fig. 1.

Fig. 3 is the corresponding plan view, one of the horses being supposedly removed.

Fig. 4 is a plan view of the frame disposed between the horses.

Fig. 5 is a plan view of the actuating levers and associated parts.

Fig. 6 is a section thereof through line VI—VI of Fig. 5.

Fig. 7 is a partial elevation showing the cable pulleys disposed under the floor.

Fig. 8 is a side view of a horse, showing the inner frame thereof.

Fig. 9 is a diagrammatical cross-section to an enlarged scale, showing the foot-plates and associated gearing.

Fig. 10 is a fragmental side view with parts in section showing a movable handle.

Fig. 11 is the corresponding cross-section.

In Fig. 1, numeral 1 designates a lower rotating floor connected with an upper floor 2 by means of stays 3. There is also provided a third or intermediate floor 4 supported on floor 1 by supports 5.

Floor 4 supports two bases 6 fixed thereto by bolts 7 and each base 6 is formed with an upward extension 8 carrying a spherical cup 9 closed by a spherical cover 10 (Fig. 8) fixed by bolts 11.

2

And members 9 and 10 enclose a ball 12 fixed at the lower end of a rod 13 which supports a framework 14. The latter in turn supports a horse 15a or 15b. Parts 9, 10 and 12 are adapted to form a ball-and-socket joint permitting oscillation of horse 15a or 15b.

The hoofs of each horse 15a or 15b are pivotally connected at 15¹ with circular plates 16 resting on springs 17 supported by floor 4. Springs 17 are normally under moderate compression and plates 16 are disposed in holes provided in floor 1, as indicated in Fig. 1.

Horses 15a and 15b are facing each other and between them there are disposed two standards or posts 18 on floor 4 by means of bolts 19, such standards carrying two longitudinal supports 20 by means of transverse members 21 fixed to the upper end of standard 18 by means of nuts 22, as indicated in Fig. 2.

Each support 20 is provided with a horizontal hole through which there is loosely passed a pivot 23 (Figs. 5 and 6) carrying a transverse horizontal shaft 24. The latter loosely supports sleeves 25 each carrying two levers 26 and 27 at an angle to each other. Lever 27 is provided with a hole 28 adapted to receive a cable 29. Intermediate washers 30 reduce the play between sleeves 25. And the latter are axially retained on shaft 24 by end washers 31 and cotter pins 32.

As indicated in Fig. 1, shafts 33 and 34 fixed to the upper part of standards 18 rotatably carry grooved pulleys 35 and 36 respectively. And beneath floor 4 are supports 37 (Figs. 1 and 7) carrying fixed shafts 38 which support loose grooved pulleys 39 and 40. There is also provided under each horse and beneath floor 4 a pair of supports 41 and 42 with fixed shafts 43 and loose pulleys 44 and 45.

A cable 29 is attached under each plate 16 and it passes through the corresponding spring 17, around pulleys 45, 40, 36 and 35 for the hindlegs, or 44, 39, 36 and 35 for the forelegs, to end in the hole 28 of a lever 27, as shown in Figs. 1 and 2. Fig. 3 also diagrammatically indicates the general arrangement.

A sort of rigid gown 46 (Figs. 1, 8 and 9) fixed to framework 14 protects the rider from any contact with the inner gearing. To each side of this gown (Fig. 9) there is fixed a foot-plate comprising a pivot 47, interior to gown 46 and to which there is hinged the foot-plate proper 48, the latter being formed with a tail portion 49 for the left side, or 50 for the right side. Tail portion 49 terminates into a lug 51, and it is connected with tail portion 50 at 52, 52 by means of a connecting rod 53, so as to rotate in opposed directions. Gown 46 is formed with appropriate openings to permit foot-plates 48 to come out of the same, as indicated in dashed lines in Fig. 9.

An abutment 54 is adapted to co-act with lug 51 to limit the opening movement of foot-plates 48.

A sleeve 55 is fixed on connecting rod 53 and it is provided with a perforated lug 56 which receives the end of a returning spring 57, the other end of which is attached to a pin 59 carried by the framework 14 of the horse.

A recess 60 is formed under one foot-plate, or under both, and an opening 61 is provided to permit of operating the foot-plates to bring same into a horizontal position.

Hinges 62 (Figs. 10 and 11) are provided on the back of the horse, each side of the saddle, such hinges comprising a spindle 63 with lateral rings 64 and a central handle 65 (see also Fig. 1) loose on spindle 63. A support 66, is formed with a lug 67 to which there is attached one end of a spring 68 connected to a tail portion 69 of handle 65. Rings 64 maintain handle 65 substantially in the middle of an opening 70 in the horse's body whereby handle 65 may easily be grasped.

A deformable covering 73 (Figs. 1 and 2) covers the hoofs of the horses to prevent objects of any description to disappear between the legs. A mattress may also be provided each side of each horse to damp any eventual fall of the riders.

The operation is as follows:

The riders lower a foot-plate 48 and grasp handles 65. When they are on horseback, handles 65 are returned by springs 68 to non-apparent position. It will be remarked that actuation of one of foot-plates 48 also causes lowering of the other one through rod 53 (Fig. 9).

The two riders being on horseback and facing each other, they try to unhorse each other by actuating levers 26, the movement of the said levers corresponding to horse 15a being transmitted to the hoofs of horse 15b and vice-versa. The horses are thus caused to oscillate about their supporting joint.

Levers $26^1$, $26^2$, $26^3$ and $26^4$ of Fig. 2 correspond through the appropriate cables with the hoofs of the adverse horse, for instance levers $26^1$ and $26^2$ to the forehoofs and levers $26^3$ and $26^4$ to the hindhoofs. When the rider of horse 15a pulls levers $26^1$ and $26^2$ in the direction of arrow 71 (Fig. 1), horse 15b prances as indicated in dotted lines, since springs 17 corresponding to the hindlegs are compressed by the corresponding cables 29 acting on plates 16. At the same time the oscillation of horse 15b about the ball-and-socket joint 12 will cause decompression of the springs 17 corresponding to the forelegs, whereby levers $26^3$ and $26^4$ of the rider of horse 15a will be oscillated in a direction opposed to arrow 71, i. e. in the direction of arrow 72.

If the rider of horse 15a pulls levers $26^3$ and $26^4$, horse 15b will sink. If he pulls levers $26^1$ and $26^3$, horse 15b will tilt towards the right, and so on.

In this way, irregular movements of horse 15b will be obtained forwards, backwards, to the right or to the left. The help provided by footplates 48 at the beginning of the game may disappear if the rider's feet escape, since the footplates are immediately returned to non-apparent position within gown 46 by springs 57 (Fig. 9).

When the duration of the game has to be limited, electric braking device may be provided to lock the transmission gearing at the proper time.

I claim:

1. In a roundabout a pair of horses each adapted to carry a rider; means to support said horses while permitting same to oscillate; and means adapted to be actuated by the rider of one of said horses to cause oscillation of the other horse.

2. In a roundabout a pair of horses each adapted to carry a rider; a spherical joint to support each of said horses while permitting same to orbitally oscillate about said spherical joint; spring means to elastically maintain each of said horses at a normal average position; and means actuated by the rider of one of said horses to cause oscillation of the other horse about the corresponding spherical joint against said spring means.

3. In a roundabout a pair of horses facing each other, each adapted to carry a rider; a universal joint to support each of said horses while permitting same to orbitally oscillate about said universal joint; spring means to elastically maintain each of said horses at a normal average position; and means disposed between said horses and adapted to be actuated by the rider of each of said horses to cause oscillation of the other horse about the corresponding universal joint.

4. In a roundabout as claimed in claim 3, said last-named means being in the form of levers pivotally carried by a common support.

5. In a roundabout a pair of horses facing each other, each adapted to carry a rider; a universal joint to support each of said horses while permitting same to orbitally oscillate about said universal joint; spring means to elastically maintain each of said horses at a normal average position; a support between said horses; a row of hand-actuated levers carried by said support in front of each horse and oscillatable by a rider about a horizontal axis; and cable means to connect each of said levers to a hook of the horse disposed on the other side of said support to cause oscillation of said last-named horse about the corresponding universal joint.

6. In a roundabout as claimed in claim 5 each of said rows comprising four levers respectively connected by cables to the four hoofs of the adverse horse.

7. In a roundabout a pair of horses each adapted to carry a rider; means to support said horses while permitting same to oscillate; means adapted to be actuated by the rider of each one of said horses to cause oscillation of the other one; retractable foot-plates pivotally supported upon each side of said horses; and spring means to return said foot-plates to unapparent position within the body of the corresponding horse when they are not maintained by the rider.

8. In a roundabout as claimed in claim 7, means to connect with each other the two foot-plates corresponding to each of said horses, to cause said foot-plates to move in unison.

9. In a roundabout a pair of horses each adapted to carry a rider; means to support said horses while permitting same to oscillate; means adapted to be actuated by the rider of each one of said horses to cause oscillation of the other one; handles pivotally carried by each of said horses to facilitate the rider in making the oscillation; and spring means to return said handles to non-apparent position within the body of the corresponding horse when they are not maintained by the rider.

EDOUARD GEORGES CHATELAS.